Feb. 5, 1946. H. T. SPARROW ET AL 2,394,213
CONTROL DEVICE
Filed May 13, 1943
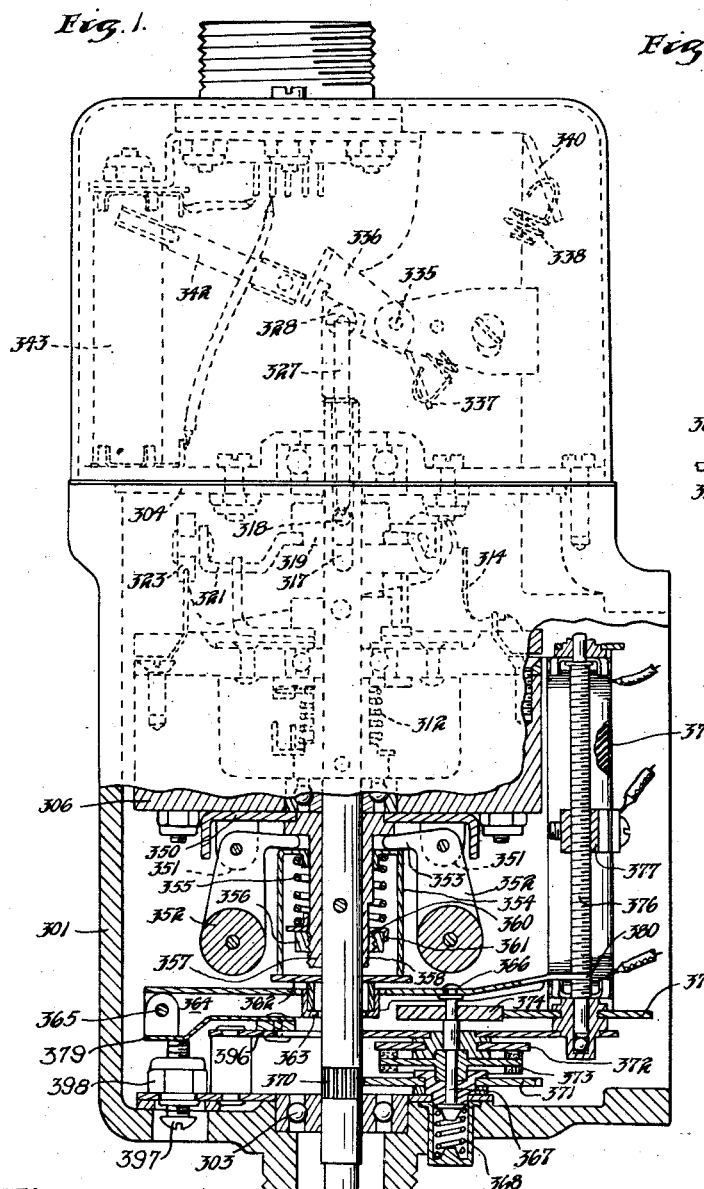
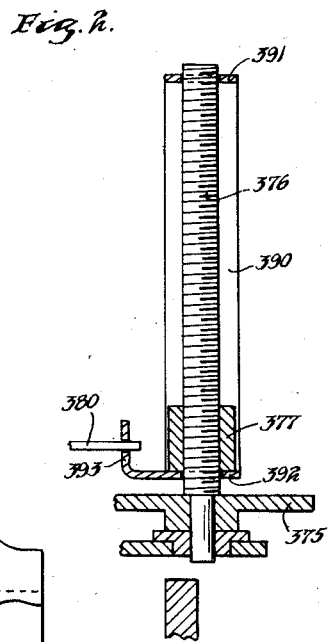
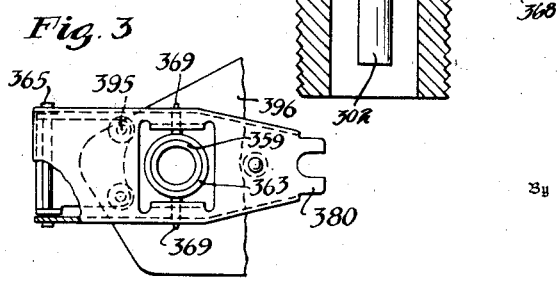
Inventors
HUBERT T. SPARROW
DANIEL G TAYLOR
GLENN H. WITTS
George H. Fisher
Attorney Patented Feb. 5, 1946

2,394,213

UNITED STATES PATENT OFFICE 2,394,213

CONTROL DEVICE

Hubert T. Sparrow, Daniel G. Taylor, and Glenn H. Witts, Minneapolis, Minn., assignors to Minneapolis-Honeywell Regulator Company, Minneapolis, Minn., a corporation of Delaware Application May 13, 1943, Serial No. 486,828

10 Claims. (Cl. 201—62)

The present invention relates to condition responsive control and/or measuring devices, and particularly to a device which is responsive to the angular velocity of a rotating shaft.

Control devices operated by weights carried by a rotating shaft and movable radially with respect to the shaft due to the centrifugal force acting on the weights are well known. Such control devices of the prior art may be classified in two groups. One of these groups consists of on and off control devices, such as switches which are closed or opened when the velocity of the rotating shaft exceeds a predetermined value. The other group includes modulatingly variable control devices, or indicators, in which a movable control member is positioned with respect to a stationary control member by the velocity responsive control device, and the position of the movable control member is utilized as an indication or measure of the instantaneous velocity of the rotating shaft. Control devices of both these types are used in control systems for limiting the speed of the rotating shaft.

It is an object of the present invention to provide an improved control device responsive to the velocity of a rotating shaft, and applicable to a control system for limiting the velocity of such a shaft.

Another object of the present invention is to provide a control device which operates in accordance with an integrated time function of the velocity of a rotating shaft. A further object is to provide such a control device which is adapted for use in a system for controlling the speed of a turbine driven supercharger, such as that system disclosed in the copending application of Hubert T. Sparrow, Serial No. 476,797, filed February 22, 1943.

A further object of the present invention is to provide a control device including a stationary control member and a movable control member, and means for driving the movable control member in one direction with respect to the stationary control member whenever the speed of a rotating shaft is above a predetermined value, and for driving the movable control member in the opposite direction whenever the speed of the shaft is below said predetermined value.

A further object of the present invention is to provide such a control device in which the movable control member is driven more rapidly when the shaft speed is in excess of the limiting value, than when it is below the limiting value.

A further object of the present invention is to provide a control device of the type described in which the power for driving the movable member with respect to the stationary member is taken from the shaft to whose velocity the device responds.

A further object is to provide, in such a system, a velocity controlled clutch for transmitting motion between the rotating shaft and the movable control member. A further object is to provide, in connection with such a velocity controlled clutch, an arrangement whereby the movement of the movable control member to the end of its travel causes the clutch to be released so that the movable member cannot be driven further in that direction.

Other objects and advantages of the present invention will become apparent from a consideration of the accompanying claims, specification, and drawing, in which:

Figure 1 is an elevational view of a control device embodying our invention, in which the parts of the device relating to our invention are shown in cross-section, and certain parts having no bearing upon the present invention are shown in dotted lines, Figure 2 is a cross-sectional elevation of a modification of one detail of the control device illustrated in Figure 1, and Figure 3 is a plan view of another detail of the device of Figure 1, on a somewhat reduced scale.

FIGURE 1

There is shown in Figure 1 a control device which includes an acceleration responsive controller and a velocity responsive controller. The details of the acceleration responsive controller form no part of the present invention, but are shown and claimed in the co-pending application of Daniel G. Taylor, Serial No. 476,801, filed February 22, 1943. The combined unit including the acceleration responsive controller and the velocity responsive controller also forms no part of the present invention, being shown and claimed in the co-pending application of Hubert T. Sparrow, Serial No. 476,797, filed February 22, 1943.

Referring to Figure 1, there is shown a housing 301, having an aperture in the central portion of its base, through which aperture passes a shaft 302, the lower end of which is keyed or otherwise adapted for operative connection with an extension of a rotating drive shaft. The center portion of the base of casing 301 includes a bearing 303 in which the shaft 302 is journalled. The casing 301 is provided with a cover 304 carrying a bearing in which bearing the upper end of the shaft 302 is journalled.

Acceleration responsive controller

The controller responsive to the angular acceleration of shaft 302, and shown in dotted lines in the drawing, will first be described. As previously stated, this acceleration responsive controller is not a part of the present invention.

A mass 306, having a hollow of generally cylindrical form is rotatably mounted on the shaft 302 and is resiliently driven thereby through a coil spring 312. When the shaft 302 is rotating at a constant speed, the angular position of the mass 306 with respect to the shaft 302 does not change, but upon acceleration of the shaft 302 the mass 306 changes its angular position with respect to the shaft 302 because of its inertia. The spring 312 permits a limited amount of relative movement of the shaft 302 and mass 306, and biases the mass 306 so that it always returns to the same angular position with respect to shaft 302.

A cylindrical cam member 314 is adjustably supported on the mass by means described in detail in the co-pending Taylor application previously referred to.

The shaft 302 is slotted, as at 317. The portion of shaft 302 above the slot 317 is hollow. A pin 318 passes through the slot 317, and has its opposite ends fixed in a collar 319, which is slidable along the shaft 302, but because of the pin 318 and slot 317, the collar 319 is not rotatable with respect to shaft 302.

The collar 319 carries a spider comprising a plurality of arms 321, each of which has a bent-up extremity, and in that extremity carries a stub shaft on which rotates a roller follower 323 for cooperation with the cylindrical cam 314. In the structure shown in the drawing, there are three arms 321 on the spider. The cam member 314 is circumferentially divided into three similar cam portions, having a gradual rise from the lowest point thereon to the highest point thereon. At the high point of the cam, the cam surface suddenly rises, terminating at a point where it is vertical, thereby limiting the angular movement of the cam with respect to the follower assembly, which includes the spider arms 321 and the followers 323.

Within the hollow portion of the shaft 302 above the pin 318, there moves a thrust rod 327. The thrust rod 327 is tapered at both ends to fit into craters in the pin 318 and in a cross head 328. A bracket 336, pivotally mounted at 335, extends into the path of movement of the crosshead 328. The right-hand portion of the bracket 336 terminates in a tongue 337. A tension spring 338 is stretched between the tongue 337 and a stationary tongue 340. The spring 338 biases the bracket 336 for counter-clockwise rotation about a pivot shaft 335, thereby maintaining the bracket 336 in engagement with the cross head 328.

The left end of bracket 336 insulatingly carries a slider 342. The extremity of slider 342 cooperates with a slidewire resistance 343, which is mounted on the cover 304 of the casing 301.

Operation of acceleration responsive controller

The shaft 302 may be assumed to rotate in a counterclockwise direction as viewed from the bottom in Figure 1.

When the shaft 302 is rotating at a constant velocity, the angular position of the mass 306 relative to the shaft 302 is such that the followers 323 rest in the lower portions of the cam member 314. At that time, the pin 318 is at the bottom of the slot 317, and the slider 342 is at or near the lower end of the slidewire resistance 343.

Upon acceleration of the shaft 302, relative movement takes place between the mass 306 and the shaft 302, as previously explained. Since the cam 314 is fixed to the mass 306, and since the followers 323 move angularly with the shaft 302, the relative motion of the mass 306 and shaft 302 causes the followers 323 to be moved up the surfaces on the cam member 314, thereby moving the pin 318, the thrust rod 327, and the slider 342 upwardly.

Velocity responsive controller

The velocity responsive controller, which is claimed in the present application, will now be described in detail.

A plate 350, fixed on the shaft 302 just below the mass 306, is provided with diametrically opposite pairs of downwardly extending ears 351. In each of the pairs of ears 351 is journalled a shaft on which is carried a weight 352. Extensions 353 on each of the weights 352 extends toward the shaft 302, so as to provide a sort of bellcrank lever arrangement. The extensions 353 on the weights 352 engage the upper surface of a housing 354, which is slidable on the shaft 302. A compression spring 355 is carried within the housing 354 and between the top of the housing and a nut 356, which is threaded on a sleeve 357 fixed on the shaft 302. The sleeve 357 is flattened along one side, as indicated at 358. A washer 360 retains the spring 355 between the nut 356 and the housing 354. The aperture in the washer 360 is shaped to conform with the sleeve 358, so that the washer is not rotatable on the sleeve. The washer 360 has a down struck lug 361 at one side thereof which engages one of the exterior surfaces of the nut 356 and prevents rotation of the latter.

When it is desired to adjust the tension in the spring 355, the washer 360 may be forced upwardly, freeing the down struck lug 361 from engagement with the nut, whereupon the nut 356 may be rotated on the sleeve 357. After the nut has been moved to its desired position, the washer 360 may again be released, allowing the lug 361 to again engage nut 356 and lock it against rotation.

The lower portion of the housing 354 is attached to a plate 362, which bears against a sleeve 359, nested with a cup-shaped member 363. The sleeve 359 is preferably made of Bakelite, or other suitable wear resisting material. The cup-shaped member 363 is pivotally mounted on a pair of stub shafts 369 (see Fig. 3), which are fixed at diametrically opposite points on the cup-shaped member 363, and are journalled in flanges on a lever 364. The lever 364 is pivoted on a shaft 365, which is journalled in a pair of ears bent up from the opposite sides of one end of a generally flat spring member 379. The other end of the spring member 379 is riveted, as at 395, to a plate 396 fixedly mounted in the casing 301. A bolt 397 passes through a nut 398, which is fixed to the casing 301 by any suitable means. The upper end of bolt 397 engages the under surface of spring member 379, which is self-biased into engagement with bolt 397. It will be seen that by turning the bolt 397, the fulcrum point of the lever 364 may be moved upwardly or downwardly, thereby providing an additional means for adjusting the speed of shaft 302 at which lever 364 is actuated to a certain controlling position, as explained hereinafter.

The lever 364 extends from the pivot 365 across the casing 301, spanning the shaft 302 and carrying a button 366 adapted to bear against the end of a clutch shaft 367, which is biased upwardly into engagement with the button 366 by means of a compression spring 368.

Pinion teeth 370 are cut into the shaft 302. The gear 371 is rotatably mounted on the clutch shaft 367. Through a suitable gearing connection, not shown in the drawing, a second gear 372, also rotatably mounted on the clutch shaft 367, is driven in the opposite direction to the gear 371 and at a lower speed. It may be for example, that the gear 372 is driven at one-third the speed of the gear 371. The clutch shaft 367 also carries a double-faced clutch member 373, which is fixed on the said clutch shaft. Near its upper end, the clutch shaft carries a gear 374, which is also fixed on the clutch shaft, and which mates with a gear 375 fixed on a threaded shaft 376. An internally threaded nut 377 rides on the threaded shaft 376, and is moved therealong upon rotation of the shaft 376. The nut 377 carries a slider, not shown on the drawing, which engages the surface of a slidewire resistance 378 mounted in back of the shaft 376. An extension 380 at the end of lever 364 lies in the path of the nut 377 at the lower end of its range of movement.

*Operation of velocity responsive control device*

As long as the angular velocity of the shaft 302 is below a predetermined value, determined by the force of spring 355, the clutch shaft 367 is biased upwardly by the spring 368 so that clutch 373 engages gear 372. At such a time, the clutch shaft 367 is rotated in a direction so that the threaded shaft 376 rotates to carry the nut 377 downwardly. If the rotative speed of the shaft 302 remains below the predetermined value for a sufficient length of time, the nut 377 moves downwardly until it engages the extension 380 of the lever 364, whereupon the lever 364 is moved downwardly, carrying with it the clutch shaft 367 and causing disengagement of clutch 373 from the gear 372. Thereupon the clutch shaft 367 and the threaded shaft 376 are no longer rotated, and the slider carried by the nut 377 remains at the lower end of resistance 378.

If the angular velocity of the shaft 302 increases beyond the value determined by the compression of the spring 355, the centrifugal force acting on the weights 352 causes them to move outwardly, and the extensions 353 on the weights 352 to move the housing 354 downwardly, thereby carrying the lever 364 downwardly. This further downward movement of lever 364 causes the clutch shaft 367 to be moved downwardly, carrying the clutch 373 into engagement with gear 371. The clutch shaft 367 is thereupon rotated in such a direction that the threaded shaft 376 rotates in a direction to move the nut 377 upwardly, thereby moving the slider carried by nut 377 upwardly along the resistance 378.

It may therefore be seen that as long as the angular velocity of shaft 302 remains below a predetermined value, the slider is maintained at the lower end of resistance 378. When it increases above that value, the slider is moved upwardly along the resistance 378. The position of the slider on the resistance 378 at any time is not determined by the angular velocity of the shaft 302 at that particular instant, but is determined by the length of time during which the angular velocity of the shaft 302 has been above that predetermined value, and by the particular variations in angular velocity of shaft 302 which have taken place since it first exceeded that predetermined value. The position of the slider along the resistance 378 is therefore determined by a time function of the velocity of shaft 302, integrated over the entire interval during which that velocity is greater than a predetermined value.

It has been found, that in an intake manifold pressure control system of the type described in the co-pending sole Sparrow application previously referred to, the use of such a controller, which operates in accordance with an integrated function of the velocity of the compressor, provides a control which effectively limits the angular velocity of the compressor without establishing a definite and absolute limit.

A limit control of the type described effectively prevents the limiting condition from rising above a predetermined value, but nevertheless under any given set of conditions, permits a further increase in the limiting condition, and thereby prevents sudden unbalancing effects in the system which might cause undesirable hunting conditions to be established.

*Figure 2*

There is shown in Figure 2 a modification of the structure of Figure 1, in which means are provided for disconnecting the threaded shaft 376 from the main shaft 302 whenever the nut 377 approaches the limit of its movement in either direction.

In Figure 2, a generally U-shaped bracket member 390 is provided, and the arms of the U-shaped bracket member are numbered 391 and 392. Each of the arms 391 and 392 are centrally apertured so that the threaded shaft 376 may freely pass therethrough. The lower arm 392 is provided with a lateral extension carrying an upturned ear 393. The ear 393 is apertured to receive the end of extension of 380 on lever 364.

It may be seen that the arms 391 and 392 lie in the path of movement of nut 377 along shaft 376. Therefore, when the nut 377 moves downwardly along the shaft 376, it eventually reaches the position shown in the drawing, in which it engages the arm 392 of bracket member 390. Further motion of nut 377 in a downward direction acts through arm 392 and ear 393 to move extension 380 and lever 364 downwardly, thereby moving clutch shaft 367 and clutch 373 downwardly, and disengaging clutch 373 from gear 372.

Similarly, when nut 377 approaches its upward limit of movement, it engages arm 391, and acts therethrough to move bracket 390 and lever 364 upwardly, thereby moving clutch shaft 367 and clutch 373 upwardly, and disengaging clutch 373 from gear 371.

While we have shown and described certain preferred embodiments of our invention, it will be readily understood that modifications thereof will readily appear to those who are skilled in the art, and we therefore wish to be limited only by the scope of the appended claims.

We claim as our invention:

1. Electrical control apparatus, comprising in combination, an elongated electrical resistance element, a contact slidable along said resistance element, power means for driving said contact, abutment means for disengaging said power means for driving said contact when said contact is moved to a predetermined terminal position, a rotatable shaft, and means responsive to the velocity of said shaft for controlling the direction of operation of said second control member by said power means.

2. Electrical control apparatus, comprising in combination, an elongated electrical resistance element, a contact slidable along said resistance element and cooperating therewith to produce a control effect modulatingly varying in accordance with the relative positions of said contact and element, power means for driving said second control member, a rotatable shaft, means responsive to the angular velocity of said shaft and effective when said velocity departs from a predetermined value to cause operation of said second control member by said power means in a direction dependent upon the direction of such departure, and means for causing the control action of said second control member in relation to the rate of said departure to be more rapid when moving in one direction than when moving in the other direction.

3. Electrical control apparatus, comprising in combination, an elongated electrical resistance element, a contact slidable along said resistance element and cooperating therewith to produce a control effect modulatingly varying in accordance with the relative positions of said contact and element, a rotatable shaft, a device responsive to the angular velocity of said shaft, means including said device for positioning said second control member relative to said first control member as an integrated time function of said velocity, and abutment means for disengaging said positioning means when said second control member is moved to a predetermined position.

4. Electrical control apparatus, comprising in combination, an elongated electrical resistance element, a contact slidable along said element and cooperating therewith to produce a control effect modulatingly varying in accordance with the relative positions of said contact and element, a rotatable shaft, means for transmitting power from said shaft to said second control member to position said second control member relative to said first control member, and clutch means selectively operable to disconnect said second control member from said shaft or to connect said second control member to said shaft for operation in either direction, a device responsive to the angular velocity of said shaft, means including said device for operating said clutch means, and clutch disengaging means for arresting movement of said slidable contact independently of the operable movement of said responsive device.

5. Control apparatus, comprising in combination, a first control member, a second control member movable with respect to said first control member and cooperating therewith to produce a control effect modulatingly varying in accordance with the relative positions of said control members, a rotatable shaft, means for transmitting power from said shaft to said second control member to position said second control member relative to said first control member, said power transmitting means including means for driving said second control member in one direction at a different rate than in the opposite direction, and means responsive to the angular velocity of said shaft and operable to disconnect said second control member from said shaft or to connect said second control member to said shaft for operation in either direction.

6. Control apparatus, comprising in combination, a first control member, a second control member movable with respect to said first control member and cooperating therewith to produce a control effect modulatingly varying in accordance with the relative positions of said control members, a rotatable shaft, means for transmitting power from said shaft to said second control member to position said second control member relative to said first control member, said power transmitting means including means for driving said second control member in one direction at a more rapid rate than in the other direction, and clutch means selectively operable to disconnect said second control member from said shaft or to connect said second control member to said shaft for operation in either direction, a device responsive to the angular velocity of said shaft, and means including said device for operating said clutch means.

7. Electrical control apparatus, comprising in combination, an elongated electrical resistance element, a contact slidable along said element and cooperating therewith to produce a control effect modulatingly varying in accordance with the relative positions of said contact and element, a rotatable shaft, means for transmitting power from said shaft to said second control member to position said second control member relative to said first control member, a device responsive to the angular velocity of said shaft, means including said device for controlling said power transmitting means, and anti-overtravel means operable upon movement of said slidable contact to predetermined positions for preventing the delivery of operating power to said second control member.

8. Control apparatus, comprising in combination, a first control member, a second control member having a limited range of movement with respect to said first control member and cooperating therewith to produce a control effect modulatingly varying in accordance with the relative positions of said control members, a rotatable shaft, means for transmitting power from said shaft to said second control member to position said second control member relative to said first control member, and clutch means selectively operable to disconnect said second control member from said shaft or to connect said second control member to said shaft for operation thereby, means for operating said clutch means, and means associated with said second control member and effective when said second control member reaches one of its limits of movement to operate said clutch means to disconnect said second control member from said shaft.

9. Control apparatus, comprising in combination, a first control member, a second control member having a limited range of movement with respect to said first control member and cooperating therewith to produce a control effect modulatingly varying in accordance with the relative positions of said control members, a rotatable shaft, means for transmitting power from said shaft to said second control member to position said second control member relative to said first control member, said power transmitting means including means for driving said second control member in opposite directions and clutch means selectively operable to disconnect said second control member from said shaft or to connect said second control member to said shaft for operation in either direction, means for operating said clutch means, and means associated with said second control member and effective when said second control member reaches the end of its range of movement in either direction to operate said clutch means to disconnect said second control member from said shaft.

10. Control apparatus, comprising in combination, a first control member, a second control member having a limited range of movement with respect to said first control member and cooperating therewith to produce a control effect modulatingly varying in accordance with the relative positions of said control members, a rotatable shaft, means for transmitting power from said shaft to said second control member to position said second control member relative to said first control member, said power transmitting means including means for driving said second control member in opposite directions, and clutch means selectively operable to disconnect said second control member from said shaft or to connect said second control member to said shaft for operation in either direction, means for operating said clutch means, and means associated with said second control member and effective when said second control member reaches one of its limits of movement to operate said clutch means to disconnect said second control member from said shaft, while permitting operation of said clutch means in a sense to cause movement of said second control member away from said one limit.

HUBERT T. SPARROW.
DANIEL G. TAYLOR.
GLENN H. WITTS.